(12) United States Patent
Lim et al.

(10) Patent No.: US 10,647,082 B2
(45) Date of Patent: May 12, 2020

(54) SANDWICH PANEL AND METHOD FOR MANUFACTURING SAME

(71) Applicant: LG HAUSYS, LTD., Seoul (KR)

(72) Inventors: Ji-Won Lim, Seoul (KR); Dong-Eung Kim, Gunpo-si (KR); Sang-Hyun Rho, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 71 days.

(21) Appl. No.: 15/559,763

(22) PCT Filed: Mar. 21, 2016

(86) PCT No.: PCT/KR2016/002811
§ 371 (c)(1),
(2) Date: Sep. 19, 2017

(87) PCT Pub. No.: WO2016/148549
PCT Pub. Date: Sep. 22, 2016

(65) Prior Publication Data
US 2018/0065335 A1     Mar. 8, 2018

(30) Foreign Application Priority Data

Mar. 19, 2015  (KR) .......... 10-2015-0037923

(51) Int. Cl.
| | | |
|---|---|---|
| *B32B 7/12* | (2006.01) | |
| *B32B 17/02* | (2006.01) | |
| *B32B 3/12* | (2006.01) | |
| *B32B 5/10* | (2006.01) | |
| *B32B 15/20* | (2006.01) | |
| *B32B 15/16* | (2006.01) | |
| *B32B 5/08* | (2006.01) | |
| *B32B 15/18* | (2006.01) | |
| *B32B 37/12* | (2006.01) | |
| *B32B 15/04* | (2006.01) | |
| *B32B 37/24* | (2006.01) | |

(52) U.S. Cl.
CPC .................. *B32B 3/12* (2013.01); *B32B 5/08* (2013.01); *B32B 5/10* (2013.01); *B32B 7/12* (2013.01); *B32B 15/043* (2013.01); *B32B 15/16* (2013.01); *B32B 15/18* (2013.01); *B32B 15/20* (2013.01); *B32B 37/12* (2013.01); *B32B 37/1284* (2013.01); *B32B 37/24* (2013.01); *B32B 2250/40* (2013.01); *B32B 2255/06* (2013.01); *B32B 2262/0253* (2013.01); *B32B 2262/0261* (2013.01); *B32B 2262/0276* (2013.01); *B32B 2262/101* (2013.01); *B32B 2262/103* (2013.01); *B32B 2262/106* (2013.01); *B32B 2262/14* (2013.01); *B32B 2307/546* (2013.01); *B32B 2307/732* (2013.01); *B32B 2457/20* (2013.01); *B32B 2509/00* (2013.01)

(58) Field of Classification Search
CPC ...................... B32B 2250/40; B32B 2262/14
See application file for complete search history.

(56) References Cited

U.S. PATENT DOCUMENTS

| | | | |
|---|---|---|---|
| 4,034,134 A | 7/1977 | Gregorian et al. | |
| 7,951,258 B2 * | 5/2011 | Karlsson | B32B 37/24 156/241 |
| 2003/0082335 A1 | 5/2003 | Clyne et al. | |
| 2010/0264266 A1 * | 10/2010 | Tsotsis | B32B 5/26 244/117 R |

FOREIGN PATENT DOCUMENTS

| | | |
|---|---|---|
| EP | 0333685 A2 | 9/1989 |
| EP | 1492672 B1 | 9/2010 |
| KR | 10-2000-0022330 A | 4/2000 |
| KR | 10-0786335 B1 | 12/2007 |
| KR | 10-2009-0064837 A | 6/2009 |

OTHER PUBLICATIONS

Nashed et al; Advanced Materials Research; vol. 441; Issue: 1; p. 717-725. (Year: 2012).*
International Search Report for PCT/KR2016/002811 dated Jul. 25, 2016.

* cited by examiner

*Primary Examiner* — Karuna P Reddy
(74) *Attorney, Agent, or Firm* — Hauptman Ham, LLP

(57) ABSTRACT

Provided are a sandwich panel and a method for manufacturing same, the sandwich panel comprising: a flocking core layer; and skin layers stacked on either side of the flocking core layer, wherein the flocking core layer comprises a mixed fiber containing at least two types of fibers having different average cross sectional diameters.

11 Claims, 1 Drawing Sheet

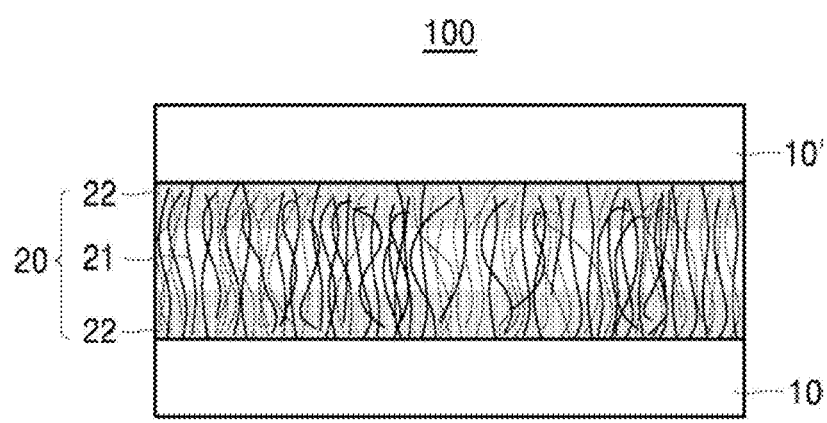

SANDWICH PANEL AND METHOD FOR MANUFACTURING SAME

CROSS REFERENCE TO RELATED APPLICATION

This application claims the priority of Korean Patent Application No. 10-2015-0037923 filed on Mar. 19, 2015, in the Korean Intellectual Property Office, the disclosure of which is incorporated herein by reference. Further, this application is the National Phase application of International Application No. PCT/KR2016/002811 filed Mar. 21, 2016, which designates the United States and was published in Korean.

TECHNICAL FIELD

The present disclosure relates to a sandwich panel and a method for manufacturing the sandwich panel.

BACKGROUND ART

Conventional sandwich panels have a core material manufactured by using a material such as balsa wood or foamed plastic for lightweight or by using a honeycomb structure made of a metal material for improvement of sound insulation, flame retardancy, etc. However, in general, general sandwich panels including such a core material have problems in that interlayer bonding force is weak or strength is weak, and thus, moldability is poor when it is processed into various shapes. For example, Korean Patent No. 10-0786335 discloses a sandwich panel for interior and exterior materials, including a balsa wood panel. The balsa wood panel includes a unit panel and a heterogeneous material panel formed of any one of a cork material and a resin material, and has purposes for lightweight and improvement of sound insulation. In addition, Korean Patent Laid-Open No. 10-2009-0064837 discloses a sandwich panel for a vehicle having a paper honeycomb core and support sheets bonded to both sides of the honeycomb core, including adhesive layers interposed therebetween. The sandwich panel having the honeycomb core is intended to secure rigidity relative to weight and the low manufacturing cost and to obtain an effect of in-mold molding. As described above, the sandwich panel having the balsa wood or the honeycomb core has limitations in view of prevention of interlayer delamination and prevention of wrinkle occurrence in implementing various shapes through molding including a large degree of modification. Therefore, there is a need for research on a sandwich panel capable of overcoming the structural limitations for excellent moldability while simultaneously securing a high level of support performance and mechanical properties.

DISCLOSURE

Technical Problem

It is an aspect of the present disclosure to provide a sandwich panel having excellent moldability to be capable of being modified to a high level while having excellent support rigidity and mechanical properties.

It is another aspect of the present disclosure to provide a method for manufacturing the sandwich panel.

Technical Solution

In accordance with one aspect of the present disclosure, a sandwich panel includes: a flocking core layer; and skin layers stacked on both sides of the flocking core layer, wherein the flocking core layer includes a mixed fiber containing at least two types of fibers having different average cross-sectional diameters.

The flocking core layer may include the mixed fiber and an adhesive.

The flocking core layer may have a structure in which the mixed fiber is planted on the adhesive.

The adhesive may include one selected from the group consisting of acrylic adhesive, silicone-based adhesive, rubber-based adhesive, and a combination thereof.

The mixed fiber may include a first fiber having an average cross-sectional diameter of 40 μm to 70 μm; and a second fiber having an average cross-sectional diameter of 10 μm to 20 μm.

The mixed fiber may have a volume ratio of the first fiber to the second fiber in the flocking core layer of 4:1 to 9:1.

The mixed fiber may have an average length of 0.5 mm to 2.0 mm.

The mixed fiber may include one selected from the group consisting of carbon fiber, glass fiber, metal fiber, polyamide fiber, polyethylene fiber, polyester fiber, and a combination thereof.

The skin layer may include one selected from the group consisting of aluminum, galvanized steel iron (GI), stainless steel, magnesium, and a combination thereof.

The skin layer may have a thickness of 0.1 mm to 1.0 mm.

The flocking core layer may have a thickness of 0.5 mm to 2.0 mm.

The sandwich panel may be used as a display device lower cover.

In accordance with one aspect of the present disclosure, a method for manufacturing a sandwich panel includes: preparing a mixed fiber containing at least two types of fibers having different average cross-sectional diameters; preparing two skin layers and applying an adhesive to one side of each of the skin layers; planting the mixed fiber on the adhesive of at least one skin layer of the two skin layers in which the adhesive is applied to one side; and stacking the two skin layers so that the respective sides applied with the adhesive face each other to thereby manufacture a flocking core layer.

The mixed fiber may be prepared by mixing a first fiber having an average cross-sectional diameter of 40 μm to 70 μm and a second fiber having an average cross-sectional diameter of 10 μm to 20 μm.

The mixed fiber may be prepared by mixing the first fiber and the second fiber so that a volume ratio of the first fiber and the second fiber in the flocking core layer is 4:1 to 9:1.

The flocking core layer may be manufactured by planting the mixed fiber on the adhesive by an electrostatic deposition method.

At the time of applying an adhesive to one side of each of the skin layers, the adhesive may be applied so that an average thickness of the adhesive is 100 to 300 μm.

The method for manufacturing a sandwich panel may further include curing the adhesive applied to one side of the skin layer.

Advantageous Effects

The sandwich panel of the present disclosure may exhibit moldability to be capable of being modified to a high level while having excellent mechanical properties and support rigidity, and at the same time, may implement a lightweight effect to extend an application range.

Further, the method for manufacturing the sandwich panel provides a method for manufacturing the sandwich panel in a simple manner, thereby making it possible to manufacture the sandwich panel having excellent physical properties with high efficiency.

DESCRIPTION OF DRAWINGS

FIG. 1 schematically shows a cross section of a sandwich panel according to an exemplary embodiment of the present disclosure.

BEST MODE

Hereinafter, various advantages and features of the present disclosure and methods accomplishing them will become apparent with reference to the following description of Examples. However, the present disclosure is not limited to exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims. Like reference numerals refer to like components throughout the specification.

In the drawings, thicknesses of various layers and regions are exaggerated for clarity. In the drawings, thicknesses of partial layers and regions are exaggerated for convenience of explanation.

It will be understood that when an element such as a layer, a film, a region, or a substrate is referred to as being "on" another element, it can be directly on the other element or intervening elements may also be present. It will be understood that when an element such as a layer, a film, a region, or a substrate is referred to as being "on" another element, it can be directly on the other element or intervening elements may also be present. In contrast, when an element is referred to as being "directly on" another element, there are no intervening elements present.

In an exemplary embodiment of the present disclosure, there is provided a sandwich panel including: a flocking core layer; and skin layers stacked on both sides of the flocking core layer, wherein the flocking core layer includes a mixed fiber containing at least two types of fibers having different average cross-sectional diameters.

FIG. 1 schematically shows a cross section of a sandwich panel 100 according to an exemplary embodiment of the present disclosure. Referring to FIG. 1, the sandwich panel 100 has a structure in which a skin layer 10, a flocking core layer 20, and a skin layer 10' are sequentially stacked, and the flocking core layer 20 may include a mixed fiber 21.

In general sandwich panels, a core material part corresponding to the flocking core layer 20 is made of a material such as honeycomb, foam, fiber-reinforced plastic (LFT), or the like. In this case, lightweight, sound insulation, flame retardancy, etc., may be secured, but it is difficult to secure a high level of moldability and excellent support performance relative to thickness.

The sandwich panel 100 of the present disclosure may include the flocking core layer 20 as the core material, thereby exhibiting excellent support performance and durability while simultaneously securing a high level of moldability as compared to the related art.

Specifically, the flocking core layer 20 may include the mixed fiber in which at least two types of fibers are mixed, and the mixed fiber may include at least two types of fibers having different average cross-sectional diameters. Since the flocking core layer includes the mixed fiber containing at least two types of fibers having different average cross-sectional diameters as described above, strength and rigidity in which the flocking core layer 20 supports the skin layer may be further improved, and the sandwich panel 100 may secure overally excellent mechanical properties and durability.

Term 'flocking' refers to a processing method of depositing or planting a fiber on a predetermined surface. In the present specification, the 'flocking core layer' refers to a core layer manufactured by using or utilizing such a method.

Specifically, referring to FIG. 1, the flocking core layer 20 may include the mixed fiber 21 and the adhesive 22 together. In this case, the mixed fiber 21 may be present in a form in which some or all of the respective fiber strands are bonded to the adhesive 22. When the respective fiber strands are bonded to the adhesive 22, a flocking processing method for depositing or planting the fiber strands on the predetermined surface formed of the adhesive 22 may be used or utilized.

As a result, referring to FIG. 1, the flocking core layer 20 may have a structure in which the mixed fiber 21 is planted on the adhesive 22, and more specifically, the flocking core layer 20 may include a structure in which a layer of the adhesive 22 including planted end portions of the mixed fiber, and a layer formed of only the mixed fiber 21 are stacked. Accordingly, the flocking core layer 20 may excellently support the skin layers 10 stacked on both sides thereof, and may impart excellent moldability and mechanical properties to the entire sandwich panel 100.

The adhesive 22 is not particularly limited as long as it is able to firmly bond the mixed fiber 21 and to secure adhesive force of the skin layers 10 and the flocking core layer 20. For example, the adhesive may include one selected from the group consisting of acrylic adhesive, silicone-based adhesive, rubber-based adhesive, and a combination thereof.

Here, the adhesive 22 may include a photo-curing adhesive or a thermosetting adhesive, and may be cured by using either or both of a photo-curing method and a thermal curing method.

Specifically, the adhesive 22 may be included in the core layer 20 while forming a layer. More specifically, it may be configured as an adhesive layer on which the adhesive is applied to at least one interface in respective interfaces of the core layer 20 and the skin layers 10 and 10'.

Here, the adhesive layer may have a thickness of about 100 μm to about 300 μm, and specifically, about 150 μm to about 250 μm. The adhesive layer may be firmly bonded to the mixed fiber 21 by maintaining the thickness range. Further, when the adhesive layer has a thickness of less than about 100 μm, an adhesive area between the mixed fiber and the adhesive layer is excessively lowered, which reduces adhesive force, and when the adhesive layer has a thickness of more than about 300 μm, overall density of the core layer is excessively increased, which is disadvantageous for improving a lightweight effect and moldability.

The mixed fiber 21 is obtained by mixing at least two types of fibers having different average cross-sectional diameters as described above. Specifically, the mixed fiber may include a first fiber having an average cross-sectional diameter of about 40 μm to about 70 μm; and a second fiber having an average cross-sectional diameter of about 10 μm to about 20 μm. By mixing the first fiber and the second fiber, the mixed fiber 21 may exhibit excellent support rigidity in the flocking core layer 20, thereby allowing the sandwich panel 100 to implement moldability and mechanical properties having a level suitable for being processed and used as a display device lower cover as described below.

A cross section of the first fiber may have an average diameter of about 40 μm to about 70 μm, for example, about 50 μm to about 65 μm. When the average cross-sectional diameter of the first fiber is less than the above-described range, the flocking core layer 20 may not secure rigidity sufficient to support the skin layers 10. When the average cross-sectional diameter thereof is more than the above-described range, the manufacturing cost may be excessively increased, or the moldability of the sandwich panel may be deteriorated.

A cross section of the second fiber may have an average diameter of about 10 μm to about 20 μm, for example, about 13 μm to about 19 μm. The second fiber is interposed between the first fibers to further improve support strength and mechanical properties of the flocking core layer. Since the cross section of the second fiber has the above-described range of average diameter, it is possible to secure strength having a level suitable for being used as a display device lower cover, and at the same time, to impart good moldability to the sandwich panel 100, thereby performing processing with high level of modification.

When the flocking core layer 20 includes the mixed fiber of the first fiber and the second fiber, a volume ratio of the first fiber to the second fiber in the flocking core layer may be about 4:1 to about 9:1. Since relatively thick first fiber and the relatively thin second fiber are contained in the flocking core layer so as to have the above-described range of volume ratio, the sandwich panel may exhibit excellent moldability while securing a high level of strength.

An average length of the mixed fiber may be suitably adjusted as needed, but may be, for example, about 0.5 mm to about 2.0 mm. Since the average length of the mixed fiber satisfies the above-described range, the flocking core layer and the sandwich panel may have an appropriate thickness, thereby implementing a slim design and securing a high level of strength at the same time.

The mixed fiber may include one selected from the group consisting of carbon fiber, metal fiber, polyamide fiber, polyethylene fiber, polyester fiber, and a combination thereof. For example, the mixed fiber may include polyamide fiber, polyethylene fiber, or polyester fiber. In this case, it is advantageous for the sandwich panel to secure excellent strength and moldability at the same time relative to the manufacturing cost.

The skin layer may be formed of a metal material, and specifically, may include one selected from the group consisting of aluminum, electrogalvanized steel sheet (EGI), galvanized steel sheet (GI), stainless steel, magnesium, and a combination thereof. For example, the skin layer may include an electrogalvanized steel sheet. In this case, moldability may be good due to excellent elongation, and it may be more advantageous in view of low cost and high flexural rigidity. Further, it is possible to obtain an advantageous effect in view of lightweight as compared to when aluminum is used for the skin layer.

The sandwich panel 100 has a structure in which the skin layer 10, the flocking core layer 20, and the skin layer 10 are sequentially stacked from the top, wherein each skin layer 10 may have a thickness of about 0.1 mm to about 1.0 mm. By maintaining the thickness of the skin layer within the above-described range, it is possible to secure excellent moldability in processing such as bending or welding the sandwich panel, and to secure a high level of strength suitable for being used as a display device lower cover, etc.

In addition, the flocking core layer 20 may have a thickness of about 0.5 mm to about 2.0 mm. Since the thickness of the flocking core layer satisfies the above-described range, it is possible to secure excellent support strength, thereby appropriately maintaining structural rigidity of the skin layers stacked on both sides thereof, and thereby securing high process efficiency in manufacturing the sandwich panel by using the mixed fiber.

The sandwich panel may be used as various components and applications in fields of architecture, automobile, display device, etc., but specifically, may be used as a lower cover of a display device, and more specifically, as a lower cover of TV.

By using the sandwich panel as the lower cover of the display device, it is possible to implement slimness and lightweight. Processing with high level of modification may be performed based on excellent moldability while excellently maintaining the sandwich structure without an inter-layer delamination phenomenon and a wrinkle occurrence phenomenon in the process of manufacturing the sandwich panel as the lower cover.

For example, the sandwich panel may be molded to have a concave part and a convex part by integrally molding the skin layer and the flocking core layer through pressing, and even in this case, the sandwich panel may be molded to have a desired shape without delamination of the skin layer and the flocking core layer or without wrinkle occurrence.

In another exemplary embodiment of the present disclosure, there is provided a method for manufacturing a sandwich panel including: preparing a mixed fiber containing at least two types of fibers having different average cross-sectional diameters; preparing two skin layers and applying an adhesive to one side of each of the skin layers; planting the mixed fiber on the adhesive of at least one skin layer of the two skin layers in which the adhesive is applied to one side; and stacking the two skin layers in which the adhesive is applied to one side so that the respective sides applied with the adhesive face each other, thereby manufacturing a flocking core layer.

The sandwich panel 100 including the flocking core layer 20 and the skin layers 10 and 10' may be manufactured through the method for manufacturing a sandwich panel. Specifically, as shown in FIG. 1, it is possible to manufacture the sandwich panel 100 in which the skin layer 10', the flocking core layer 20, and the skin layer 10 are sequentially stacked. Here, description regarding the flocking core layer and the skin layers is the same as described above.

The method for manufacturing a sandwich panel includes preparing a mixed fiber, and specifically, the mixed fiber may be prepared by mixing at least two types of fibers having different average cross-sectional diameters. By manufacturing the flocking core layer using the mixed fiber, the sandwich panel may simultaneously secure improved moldability and excellent mechanical properties.

Specifically, in the step of manufacturing the mixed fiber, the mixed fiber may be prepared by mixing a first fiber having an average cross-sectional diameter of about 40 μm to about 70 μm and a second fiber having an average cross-sectional diameter of about 10 μm to about 20 μm, and description regarding the first fiber and the second fiber is the same as described above.

Further, the mixed fiber may be prepared by mixing the first fiber and the second fiber so that a volume ratio of the first fiber and the second fiber in the flocking core layer is 4:1 to 9:1. The first fiber and the second fiber may be mixed in the flocking core layer to have the above-described range of volume ratio, and thus, excellent process efficiency may be secured in the step of planting the mixed fiber on the adhesive in a subsequent process, and the sandwich panel manufactured thereby may exhibit excellent moldability while securing a high level of strength.

The method for manufacturing a sandwich panel includes preparing two skin layers 10 and 10' and applying an adhesive 22 to one side of each of the skin layers, and description regarding the skin layer and the adhesive is the same as described above.

The method of applying an adhesive to one side of the skin layers may be any one selected from a die coating method, a gravure coating method, a knife coating method, a bar coating method, and a spray coating method. Specifically, the adhesive may be coated by the knife coating method, and in this case, the adhesive may be coated with an even and uniform thickness in view of viscosity of the adhesive.

The method for manufacturing a sandwich panel may include planting the mixed fiber on an adhesive of at least one skin layer of the two skin layers in which the adhesive is applied to one side. Specifically, the planting of the mixed fiber may be performed on any one of the two skin layers in which the adhesive is applied to one side, or on both of the skin layers.

At this time, the mixed fiber may be planted on the adhesive by an electrostatic deposition method. Specifically, since the mixed fiber is an insulator itself, a predetermined level of electrical conductivity is required to be imparted through electrification treatment so as to respond to an electric field. In addition, treatment with a separating agent is required to be performed so that the mixed fibers do not aggregate between the fibers. Then, the mixed fiber may be planted on the adhesive by using an electrostatic field, thereby manufacturing the flocking core layer.

In the step of applying an adhesive to one side of the skin layers 10 and 10', the adhesive may be applied so that a thickness of the adhesive 22 is about 100 µm to about 300 µm. By applying the adhesive to have the above-described range of thickness, when the mixed fiber is planted on the adhesive, the process efficiency may be improved based on excellent adhesive property, and the skin layer and the flocking core layer may exhibit a high level of bonding force.

Further, the method for manufacturing a sandwich panel may include stacking the two skin layers so that the respective sides applied with the adhesive face each other to thereby manufacture a flocking core layer. Specifically, in the method for manufacturing a sandwich panel, the adhesive may be applied to one side of each of the two skin layers, the mixed fiber may be planted on at least one skin layer of the two skin layers, and then the two skin layers may be stacked so that the respective sides applied with the adhesive face each other, thereby manufacturing the flocking core layer.

As described above, the two skin layers may be stacked so that the respective sides applied with the adhesive face each other, thereby forming the flocking core layer having a shape in which the mixed fiber is planted on the adhesive of both of the two skin layers.

Since the mixed fiber of the flocking core layer is planted on all adhesives of the two skin layers, bonding force between the respective layers of the sandwich panel may be improved, and therefore, with respect to the sandwich panel, processing with a high level of modification may be performed without damaging the multilayer structure, and at the same time, excellent support performance and strength may be exhibited.

Further, the method for manufacturing a sandwich panel may further include curing the adhesive applied to one side of the skin layer. The adhesive may be applied to one side of each of the two skin layers, and the step of curing the adhesive may be performed by separately curing the adhesive of each of the skin layers or by curing the adhesive of the two skin layers at a time.

The method of curing the adhesive may be performed by using any one of a photo-curing method and a thermosetting method, or by using the two methods in combination, depending on whether the adhesive is a thermosetting adhesive or a photo-curing adhesive.

The sandwich panel includes the flocking core layer and the skin layers stacked on both sides of the flocking core layer, wherein the flocking core layer includes the mixed fiber containing at least two types of fibers having different average cross-sectional diameters. Through the flocking core layer, excellent moldability and rigidity may be secured at the same time as compared to the conventional sandwich panels, and when used as the lower cover of the display device, a high level of shape modification may be performed, and excellent support strength may be implemented.

Hereinafter, specific examples of the present disclosure will be provided. It is to be noted that Examples to be described below are provided merely for specifically exemplifying or explaining the present disclosure, and accordingly, the present disclosure is not limited to the following Examples.

EXAMPLE AND COMPARATIVE EXAMPLE

Example 1

A first polyamide fiber having an average cross-sectional diameter of 50 µm and an average length of 2.0 mm and a second polyamide fiber having an average cross-sectional diameter of 20 µm and an average length of 2.0 mm were mixed to each other, thereby preparing a mixed fiber. Then, an electrogalvanized steel sheet skin layer having a thickness of 0.3 mm was prepared, and a thermosetting epoxy-based adhesive was applied to one side of the skin layer to a thickness of 200 µm. Then, the mixed fiber was planted on an upper part of the adhesive by an electrostatic deposition method, thereby manufacturing a flocking core layer. Then, another skin layer formed of the same material and having the same thickness as the above skin layer was prepared, and the thermosetting epoxy-based adhesive was applied to one side thereof to a thickness of 200 µm. Next, the another skin layer was stacked so that the adhesive portion applied to one side thereof was in contact with the flocking core layer. Subsequently, the thermosetting epoxy-based adhesive was thermally cured at 105° C. to manufacture a sandwich panel. Here, a volume ratio of the first fiber to the second fiber in the flocking core layer was 5:1.

Comparative Example 1

A sandwich panel was manufactured in the same manner as in Example 1, except that only the polyamide fiber having an average cross-sectional diameter of 50 µm and an average length of 2.0 mm was used instead of the mixed fiber of Example 1.

Comparative Example 2

Instead of the flocking core layer of Example 1, a core layer was prepared by melting polypropylene resin powder, mixing with 25 parts by weight of glass fiber having an average cross-sectional diameter of 17 μm and an average length of 30 mm based on 100 parts by weight of the molten resin, and manufacturing the mixture into a sheet form.

<Evaluation>

1) Evaluation of Moldability

The sandwich panels of Example 1 and Comparative Examples 1 and 2 were subjected to a cylindrical cup deep drawing test using an Ericsson cylindrical cup deep drawing tester (Ericsson), and each limit drawing ratio (LDR) was deduced according to Equation 1 below to confirm moldability. The larger the LDR values, the more excellent the moldability. Results thereof are shown in Table 1 below.

LDR=Diameter (mm) of largest cylindrical cup capable of being molded by deep drawing/Diameter (mm) of deep drawing punch  [Equation 1]

The maximum cylindrical cup capable of being molded by deep drawing in Equation 1 refers to a cylindrical cup having the maximum size which is not broken or cracked when the sandwich panel is subjected to deep drawing into a cylindrical cup shape. That is, it may be appreciated that as the LDR values are larger, deep drawing processability becomes excellent.

2) Evaluation of Flexural Strength and Flexural Rigidity

Flexural strength and flexural rigidity were measured according to a 3-point-bending method using ASTM C393, a sandwich panel flexural test method, on Example 1 and Comparative Examples 1 and 2. INSTRON 5569A was used for the measurement. Results thereof are shown in Table 1 below.

TABLE 1

| | Moldability | | | | |
|---|---|---|---|---|---|
| | Diameter [mm] of deep drawing punch | Cross-sectional diameter [mm] of largest cylindrical cup | LDR | Flexural Strength [MPa] | Flexural Rigidity [GPa] |
| Example 1 | 33 | 73 | 2.21 | 281 | 183 |
| Comparative Example 1 | 33 | 71 | 2.15 | 274 | 176 |
| Comparative Example 2 | 33 | 58 | 1.76 | 279 | 182 |

Referring to Table 1, it could be appreciated from the results of the above 1) that since Example 1 had excellent moldability as compared to Comparative Examples 1 and 2, processing with a large degree of shape modification could be performed, and thus, the sandwich panel could be cost-effectively used for various purposes by processing or molding of the sandwich panel itself without a separate member.

Further, it could be appreciated from the results of the above 2) that Example 1 exhibited excellent flexural strength and flexural rigidity as compared to Comparative Examples 1 and 2, and thus, excellent durability and support performance could be implemented when used for various purposes.

The invention claimed is:

1. A sandwich panel comprising:
   a flocking core layer; and
   skin layers stacked on both sides of the flocking core layer,
   wherein the flocking core layer comprises:
      a layer formed of only a mixed fiber; and
      a layer of an adhesive comprising a planted end portion of the mixed fiber, wherein the planted end portion of the mixed fiber is stacked in the layer of the adhesive,
   wherein the mixed fiber comprises:
      a first fiber, wherein an average cross-sectional diameter of the first fiber ranges from 40 μm to 70 μm; and
      a second fiber, wherein an average cross-sectional diameter of the second fiber ranges from 10 μm to 20 μm,
   wherein the mixed fiber comprises one selected from the group consisting of a polyamide fiber, a polyester fiber, and a combination thereof, and
   wherein a volume ratio of the first fiber to the second fiber in the flocking core layer ranges from 4:1 to 9:1.

2. The sandwich panel of claim 1, wherein the adhesive includes one selected from the group consisting of acrylic adhesive, silicone-based adhesive, rubber-based adhesive, and a combination thereof.

3. The sandwich panel of claim 1, wherein the mixed fiber has an average length of 0.5 mm to 2.0 mm.

4. The sandwich panel of claim 1, wherein the skin layer includes one selected from the group consisting of aluminum, galvanized steel sheet (GI), stainless steel, magnesium, and a combination thereof.

5. The sandwich panel of claim 1, wherein the skin layer has a thickness of 0.1 mm to 1.0 mm.

6. The sandwich panel of claim 1, wherein the flocking core layer has a thickness of 0.5 mm to 2.0 mm.

7. The sandwich panel of claim 1, wherein the sandwich panel is used as a display device lower cover.

8. A method for manufacturing a sandwich panel comprising:
   preparing a mixed fiber containing at least two types of fibers having different average cross-sectional diameters, wherein
      the mixed fiber comprise:
         a first fiber, wherein an average cross-sectional diameter of the first fiber ranges from 40 μm to 70 μm; and
         a second fiber, wherein an average cross-sectional diameter of the second fiber ranges from 10 μm to 20 μm,
      the mixed fiber comprises one selected from the group consisting of a polyamide fiber, a polyester fiber, and a combination thereof;
   preparing two skin layers and applying an adhesive to one side of each of the skin layers;
   planting the mixed fiber on the adhesive of at least one skin layer of the two skin layers in which the adhesive is applied to one side; and
   stacking the two skin layers so that the respective sides applied with the adhesive face each other to thereby manufacture a sandwich panel having a flocking core layer between the two skin layers, wherein
      the flocking core layer comprises:
         a layer formed of only the mixed fiber; and
         a layer of the adhesive comprising a planted end portion of the mixed fiber, wherein the planted end portion of the mixed fiber is stacked in the layer of the adhesive, and
      a volume ratio of the first fiber to the second fiber in the flocking core layer ranges from 4:1 to 9:1.

9. The method of claim 8, wherein the planting of the mixed fiber is performed by an electrostatic deposition method.

10. The method of claim 8, wherein at the time of applying an adhesive to one side of each of the skin layers, the adhesive is applied so that an average thickness of the adhesive is 100 to 300 μm.

11. The method of claim 8, further comprising:
curing the adhesive applied.

* * * * *